United States Patent [19]
Le Deit et al.

[11] Patent Number: 5,662,191
[45] Date of Patent: Sep. 2, 1997

[54] ASSEMBLY COMPRISING A FRICTION PAD, A SPRING AND A WEAR INDICATOR FOR A MOTOR VEHICLE DISC BRAKE

[75] Inventors: Gerard Le Deit, Courtry; Jean Louis Gerard, Bagnolet, both of France

[73] Assignee: AlliedSignal Europe Servives Techniques, Drancy, France

[21] Appl. No.: 537,714

[22] PCT Filed: Sep. 20, 1995

[86] PCT No.: PCT/FR95/01207

§ 371 Date: Oct. 17, 1995

§ 102(e) Date: Oct. 17, 1995

[87] PCT Pub. No.: WO96/12120

PCT Pub. Date: Apr. 25, 1996

[30] Foreign Application Priority Data

Oct. 13, 1994 [FR] France .................. 94 12183

[51] Int. Cl.$^6$ .............. F16D 66/02; F16D 65/097; F16D 65/092
[52] U.S. Cl. .............. 188/1.11 L
[58] Field of Search .............. 188/1.11, 1.11 W, 188/1.11 WE, 1.11 E

[56] References Cited

U.S. PATENT DOCUMENTS

| | | | |
|---|---|---|---|
| 3,592,295 | 7/1971 | Kennel | 188/1.11 W |
| 4,643,277 | 2/1987 | Bangert | 188/1.11 W |
| 5,048,645 | 9/1991 | Thiel et al. | 188/1.11 WE |

*Primary Examiner*—Matthew C. Graham
*Attorney, Agent, or Firm*—Leo H. McCormick, Jr.

[57] ABSTRACT

The invention relates to an assembly comprising a friction pad (A), a spring (B) and a wear indicator (C) for a motor vehicle disc brake. The friction pad (A) includes a carrier plate (10) received with anchorage and sliding in a torque-withstanding member (16) of the disc brake, a friction lining (12) being fixed to a part of the surface of a first face of the carrier plate (10) to enter into frictional contact with a rotating disc (22) when a force is applied to a second face of the carrier plate (10) opposite the first face. A through-opening (24) is formed in the carrier plate (10) for fixing a helical part (30) of the spring (B), this part being formed of at least one turn of metal wire and of a fitting part (46) of the wear indicator (C) of the friction lining (12) passing through the helical part (30) of the spring (B). According to the invention, the spring (B) includes end parts (32, 34) situated on either side of the carrier plate (10), the helical part (30) of the spring (B) being received in the opening (24) of the carrier plate (10), and the fitting part (46) of the wear indicator (C) being formed with a screw thread interacting with the helical part (30) of the spring (B).

10 Claims, 3 Drawing Sheets

ASSEMBLY COMPRISING A FRICTION PAD, A SPRING AND A WEAR INDICATOR FOR A MOTOR VEHICLE DISC BRAKE

The subject of the present invention is friction pads, equipped with springs and wear indicators, particularly intended to be installed on disc brakes for motor vehicles.

Such friction pads include, in a known fashion, a carrier plate received with anchorage and sliding in a torque-withstanding member of the disc brake, and a friction lining is fixed to a part of the surface of a first face of the carrier plate to enter into frictional contact with a rotating disc when a force is applied to a second face of the carrier plate opposite the first face. Usually, an anti-rattle spring is associated with the friction pad, as is a device indicating the state of wear of the friction lining, warning the driver of the vehicle, by means of a signal, generally a light signal, that the friction lining through wear has reached a predetermined thickness and needs to be replaced.

Very many documents illustrate this type of friction pads, such as U.S. Pat. No. 4,056,174, FR-A-2,433,676 or FR-A-2,567,601. According to the latter document, corresponding to the preamble of the main claim, a through-opening is formed in the carrier plate for fixing a helical part of the anti-rattle spring, this part being formed of at least one turn, and of a fitting part of an indicator for indicating the state of wear of the friction lining passing through the helical part of the spring.

Such a design does, however, exhibit drawbacks. Firstly, a cutout has to be formed in the friction lining to accommodate the wear indicator. It follows that the surface for friction with the rotating disc is reduced commensurately, as is the effectiveness of the disc brake thus equipped. What is more, the spring includes two turns housed respectively in two U-shaped housings made in the carrier plate and separated by a projection of the latter. In order to give a means for fastening the friction lining wear indicator, this projection includes an opening so that it forms a closed annulus around a bore.

The circumferential edge of the projection includes a U-shaped recess for guiding the part of the spring forming the link between the two turns situated on either side of the projection. A holding part of the wear indicator extends through one of the turns and includes a groove equipped with a ring which comes into abutment on a shoulder formed in the bore of the projection.

This design therefore involves a relatively complicated, and therefore expensive, shape of the carrier plate, and in particular of the projection used to fasten the spring and wear indicator. What is more, the spring is held on the carrier plate only when the fitting part of the wear indicator is itself in position in the opening of the projection, this giving rise to a risk of the spring being lost during assembly operations of the friction pad, this risk being aggravated by the fact that it is possible to fit the wear indicator onto the carrier plate without having fitted the spring beforehand.

SUMMARY OF THE INVENTION

The object of the present invention is therefore to provide a friction pad for a disc brake of the type recalled above, in which the carrier plate is simple to manufacture, in which the anti-rattle spring and the wear indicator can be fitted easily and remain fixed reliably, the wear indicator moreover giving a warning signal when the thickness of the friction lining, through wear, has reached a predetermined value.

This objective is achieved, according to the present invention, by ensuring that the spring includes end parts situated on either side of the carrier plate, the helical part of the spring being received in the opening in the carrier plate, and the fitting part of the wear indicator being formed with a screw thread which interacts with the helical part of the spring.

The anti-rattle spring is thus fixed to the carrier plate, the wear indicator is fixed to the spring by screwing and locks it in place, so that it is impossible to fit the wear indicator on the carrier plate without having fitted the spring beforehand.

Other objectives, features and advantages of the present invention will emerge more clearly from the description which follows of one embodiment given by way of illustration with reference to the appended drawings.

DETAILED DESCRIPTION OF THE INVENTION

Figure 1:
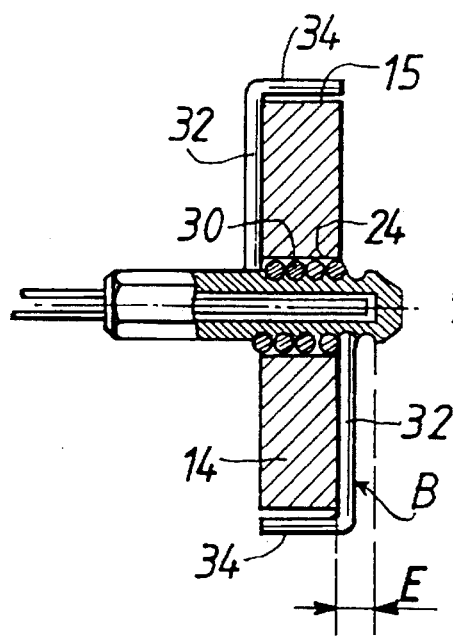
FIG. 1 represents a sectional view of an end of a friction pad according to the present invention, equipped with an anti-rattle spring and with a wear indicator.

In the various figures the same elements are denoted by the same reference numerals.

The figures represent an assembly formed of a friction pad, denoted overall by the reference A, and of a spring, denoted overall by the reference B and intended to interact with a wear indicator denoted overall by the reference C.

The friction pad A includes a carrier plate 10 with which an actual pad of friction lining 12 is associated by any suitable means, such as bonding or riveting for example. In a fashion which is known, for example from document EP-B-0,002,399, the carrier plate 10 is formed with circumferential ends consisting of extensions which do not have friction lining and which end in convex rounded surfaces, just one end 14 having been represented in FIGS. 3 and 6.

Figure 6:
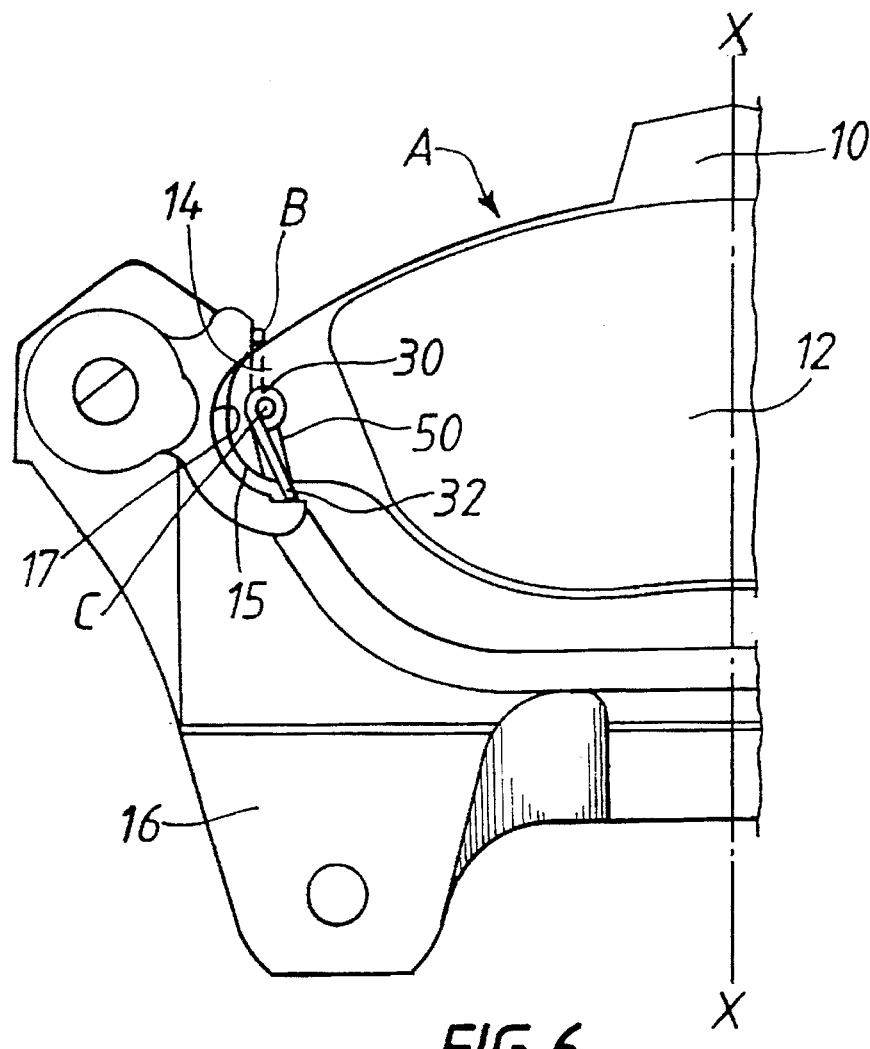
FIG. 6 represents a half view of a friction pad according to the invention received in a torque-withstanding member of a disc brake.
Figure 7:
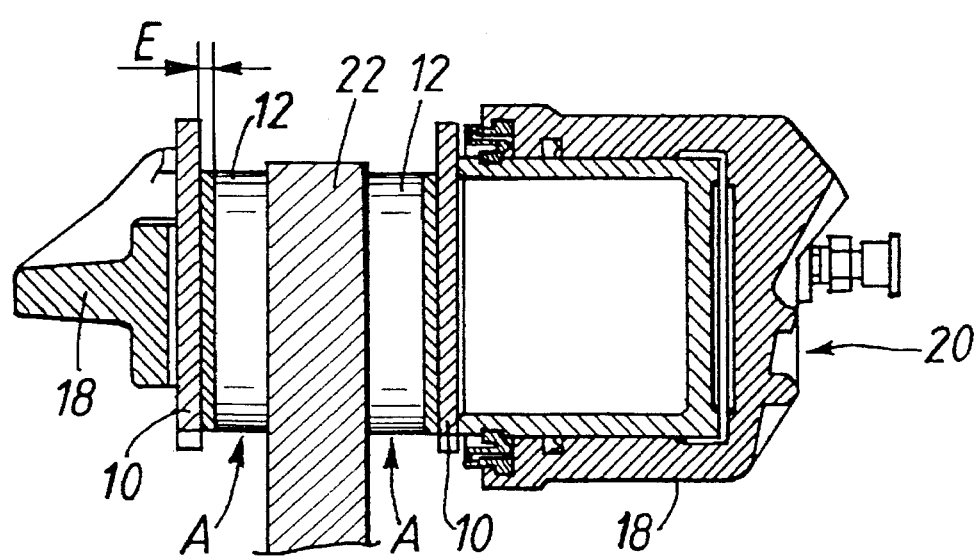
FIG. 7 represents a disc brake in section on the line X—X of FIG. 6.

As best seen in FIGS. 6 and 7, the friction pad A is intended to equip a disc brake comprising a fixed torque-withstanding member 16 designed to be associated with a fixed part of the vehicle. A calliper 18 is slidingly mounted on the torque-withstanding member 16 and includes a brake motor 20, a piston moved by a hydraulic pressure in the example represented, for applying to the face of the carrier plate which does not have a friction lining a force in the direction of a brake disc 22 designed to be associated with a part which rotates with one of the wheels of the vehicle.

The ends 14 of the friction pad A are received with anchorage and sliding in housings 17 of complementary shape formed in the torque-withstanding member 16. At least one of the ends 14 is formed with a through-opening 24 (FIGS. 1, 2 and 3) and preferably each end 14 is formed with one such opening 24 to ensure symmetry between the inboard friction pad (situated on the brake motor 20 side) and the outboard friction pad when they are manufactured, and therefore to reduce the cost thereof.

The spring B made of metal wire, is associated with the friction pad A so that it urges the latter circumferentially into the torque-withstanding member 16 and thus fulfils, on the one hand, the anti-rattle spring function and, on the other hand, the function described in the aforementioned document EP-B-0,002,399, namely forcing the convex rounded surface 15 of the end 14 of the friction pad to move along the concave surface 17 facing it defined on the torque-withstanding member 16 on each braking action.

More precisely, the spring B includes a middle part 30 formed of at least one helical turn, circular in the example represented, intended to be received with slight clearance in the opening 24 of the end 14, the turn or each end turn of the middle part being extended in the form of two straight end parts 32 which are symmetric relative to the middle part 30 and which extend substantially parallel to one another in a plane tangential to the turn or turns of the middle part.

Figures 2, 4:
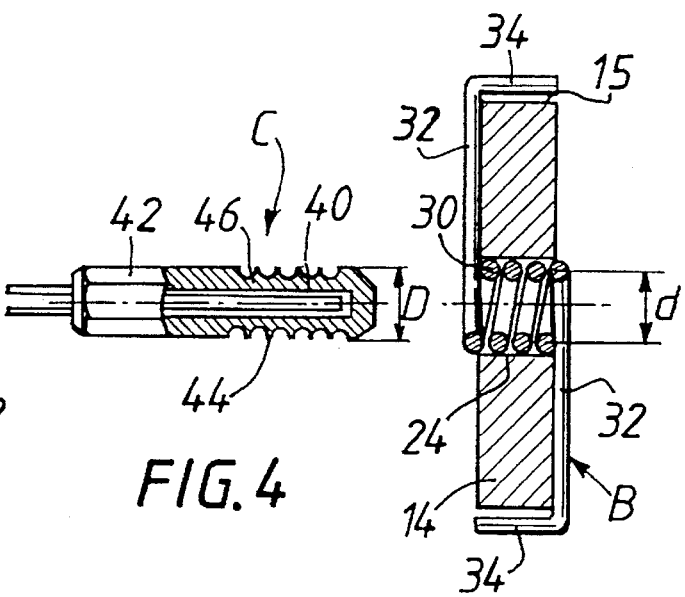
FIG. 2 represents a sectional view of one end of a friction pad according to the present invention, equipped only with an anti-rattle spring.
FIG. 4 represents a partially sectioned view of a wear indicator intended to equip the friction pad represented in FIG. 2.
Figure 5:
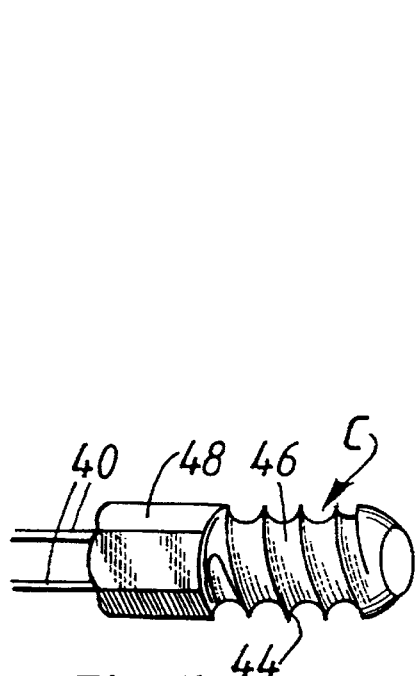
FIG. 5 represents a perspective view of the wear indicator of FIG. 4.
Figure 3:
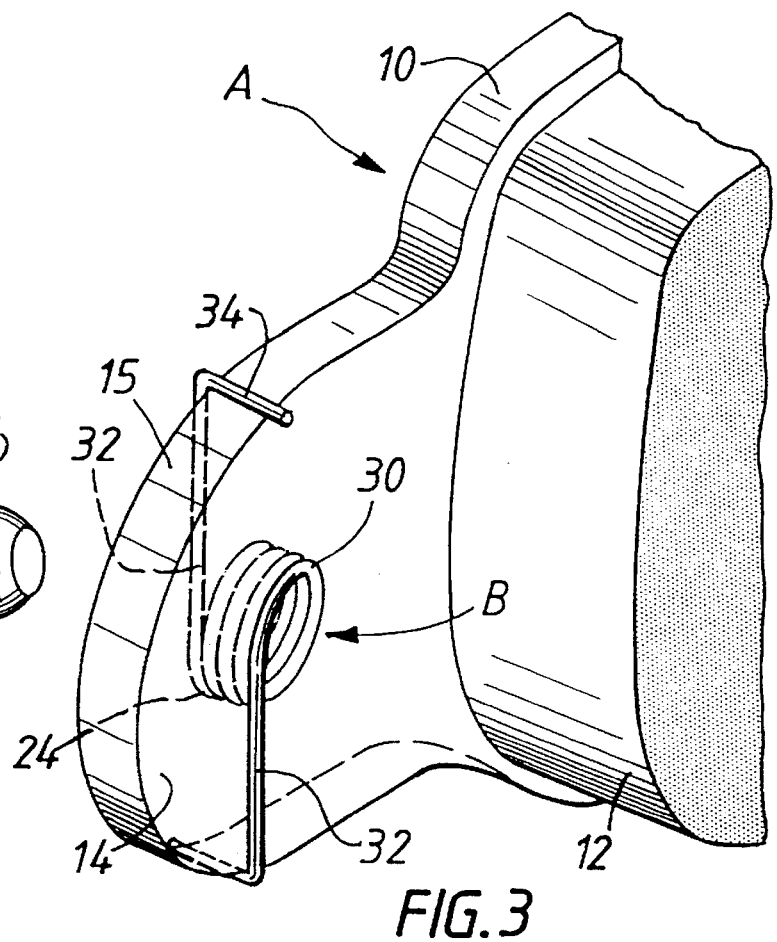
FIG. 3 represents a partial perspective view of the fitting represented in FIG. 2.

When the spring B is in place in the opening 24 of the friction pad A, the end parts 32 are situated on either side of the carrier plate 10, and extend parallel to the faces of the latter and in their immediate vicinity, as is clearly seen in FIGS. 2 and 3. The helical part 30 of the spring is therefore positioned precisely in the carrier plate 10. Preferably, the middle part 30 of the spring includes, in this position of rest (in which the spring B is in place on the friction pad A, and in which the friction pad is not yet equipped with the wear indicator C and is not yet in place in the torque-withstanding member) and depending on the diameter of the wire forming the spring, contiguous turns in a number such that the stack of these turns has an axial thickness substantially equal to the thickness of the carrier plate 10.

Advantageously, the end parts 32 are formed with terminating parts 34 folded back substantially at right angles, the terminating parts 34 having a length approximately equal to the thickness of the carrier plate 10 and being situated in immediate proximity to the outer peripheral surface 15 of the end 14, as is clearly seen in FIGS. 1 and 2.

The wear indicator C is formed of a single, or preferably looped electrical conductor 40, embedded in a body 42, for example made of thermoplastic, so that its end is situated a certain distance from the end of the body 42. The body 42 includes a fitting part 46 for fixing the wear indicator onto the friction pad, and a manoeuvring part 48, for example in the form of a hexagon nut, to make it easier to manipulate it.

In accordance with the present invention, the fitting part 46 of the wear indicator C is formed with a screw thread 44 intended to interact with the middle helical part 30 of the spring B and more precisely with the sort of tapping formed by the turn or turns which constitute this helical part 30.

From reading the foregoing it will easily have been understood how the present invention is put to use. After the friction pad A has been manufactured, that is to say after the friction lining 12 has been secured to one of the faces of the carrier plate 10, or before the friction pad A is used, the spring B is assembled on the friction pad A. To do this, one of the end parts 32 is inserted into the opening 24, then a force is exerted on the spring B to make the part 30 penetrate therein, a temporary deformation of this part 30 obtained by virtue of the elasticity of the spring making this operation easier.

Once the spring B has thus been fitted on the end 14, the wear indicator C can in turn be installed on this assembly. To do that it is simply sufficient to manipulate the manoeuvring part 48 in order to screw the fitting part 46 into the helical part 30 of the spring from that face of the carrier plate which does not have friction lining. The characteristics of the screw thread of the fitting part 46 can be chosen so that this part 46 interacts in a conventional fashion with the helical part 30 of the spring B, the internal part of which, it will have been understood, acts like a conventional tapping.

In particular, the length of the screw thread of the part 46 will be such that when the wear indicator C is screwed home into the spring B, whose position in the carrier plate 10 is perfectly determined, the end of the wire or of the loop 40 is situated at a distance E (FIG. 1) from the face of the carrier plate 10 corresponding to the minimum thickness E (FIG. 7) for the friction lining 12 for which it is desired that the warning signal for the driver of the vehicle be emitted.

Thus, by virtue of the invention, a particularly simple fitting of the wear indicator C onto the carrier plate of the friction pad A is indeed obtained, by means of the spring B. However, by way of additional advantage, the invention makes it possible to contrive for the spring B and the wear indicator C to remain fixed to the friction pad A in a particularly reliable way.

In accordance with the present invention, provision can advantageously be made for the diameter D of the fitting part 46 of the wear indicator C to be slightly greater than the inside diameter d of the helical part of the spring B, considered at rest, that is to say before assembly with the wear indicator C. These diameters are measured in a conventional way as for conventional screw threads and tappings, that is to say that the diameter D of the fitting part 46 is that of an imaginary cylinder containing the circular helical line formed by the crests of the threads of the screw thread 44, as indicated in FIG. 4, and that the diameter d of the helical part 30 of the spring B is that of an imaginary cylinder containing the circular helical line formed by the line of contact between the contiguous turns, as indicated in FIG. 2.

In that way, when the fitting part 46 is screwed into the helical part 30 it tends to enlarge the diameter of the latter. It will therefore be necessary to exert quite a high torque on the manoeuvring part 48 in order to carry out this screwing, so that the wear indicator C will remain fixed in the spring B regardless of the conditions of use and vibrations generated by the operation of the disc brake and which would tend to cause the wear indicator to become unscrewed.

Alternatively or in addition, it would be equally advantageous to contrive for the pitch of the screw thread of the fitting part 46 to be different from the pitch of the tapping formed by the turns of the helical part 30 of the spring B, and preferably greater.

In a similar way to what was described hereinabove, when the fitting part 46 is screwed into the helical part 30, it tends to space out axially the turns constituting the latter, and which were contiguous at rest. It will therefore be necessary to exert quite a high torque on the manoeuvring part 48 in order to carry out this screwing, so that the wear indicator C will remain fixed in the spring B regardless of the conditions of use and the vibrations generated by the operation of the disc brake which could result in spontaneous unscrewing of the wear indicator.

It will be noted that, when screwing the wear indicator C into the spring B if the end part 32 situated on that side of the carrier plate 10 which carries the friction lining 12 is held stationary while the other end part 32 remains free, the rubbing of the screw thread 44 on the turns of the spring B will tend to "open" these turns, which facilitates the screwing operation whilst, under the same conditions, the rubbings created during unscrewing will tend to "close up" these turns. As a result, the unscrewing operation requires the application of a much higher torque than for the screwing operation, whether this unscrewing be intentional or spontaneous.

It will therefore be possible to provide, on the face of the carrier plate 10 which has the friction lining 12 a limit stop for limiting the angular excursion of the end part 32 about the axis of the opening 24 when the wear indicator is being screwed in, the other end part 32 situated on the other side of the carrier plate remaining free to rotate about the same axis and/or another limit stop may be provided for limiting the angular excursion of the end part 32 about this axis when unscrewing the wear indicator, the other end part 32 situated on the other side of the carrier plate remaining free to rotate.

Figure 8:
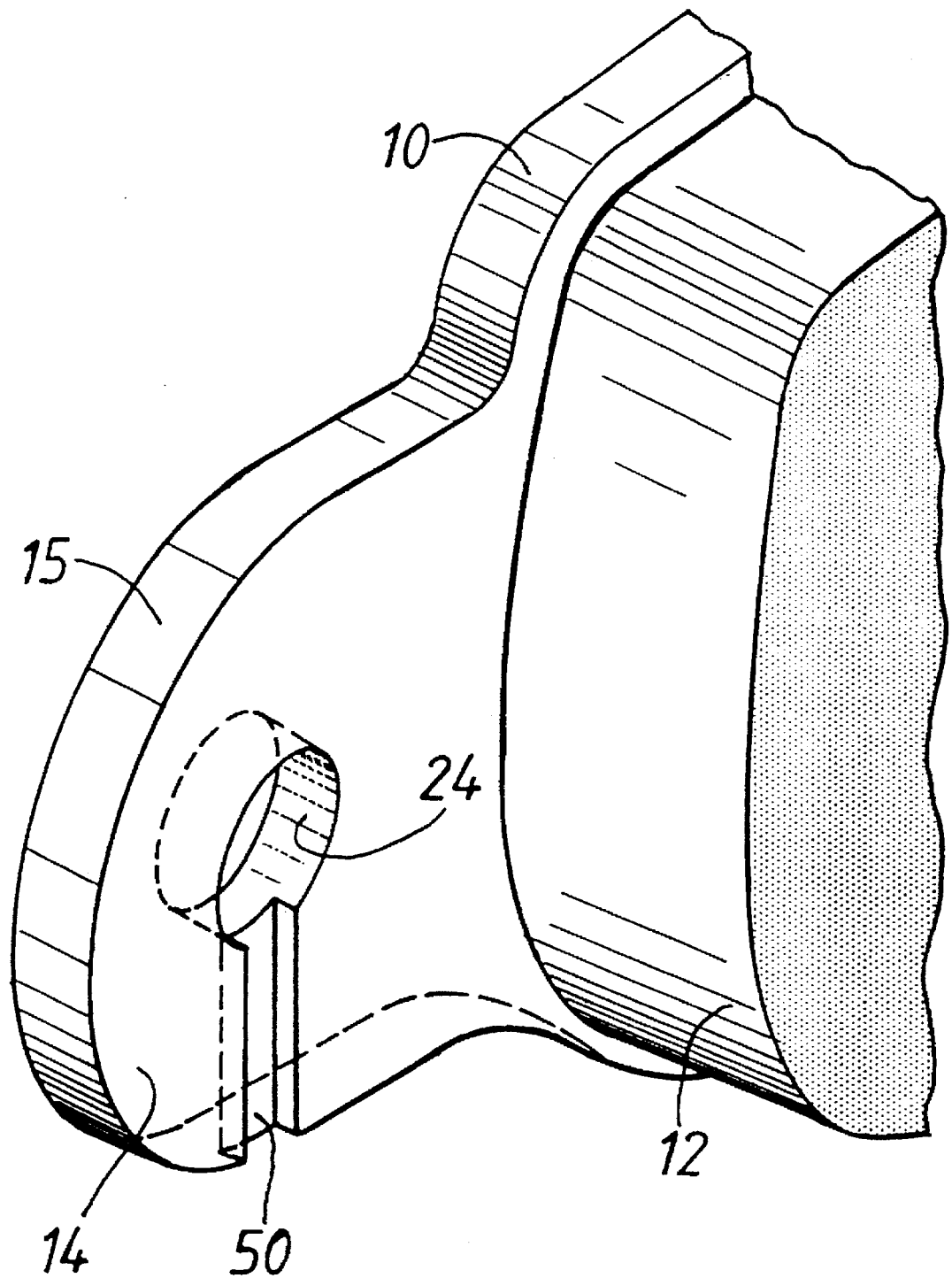
FIG. 8 represents a partial view in perspective of one end of a friction pad according to the present invention.

Each of these two limit stops could be formed by a peg formed integrally with the carrier plate or forcibly inserted into a bore in the carrier plate. In the case where it is desirable to equip the carrier plate with two limit stops for screwing and unscrewing, these may advantageously be formed simply by the flanks of a groove 50 of rectangular cross-section, the depth of which is similar to the diameter of the wire forming the spring B, this groove being hollowed from the face of the carrier plate carrying the friction lining, and extending between the opening 24 and the convex rounded surface 15, as has been represented in FIG. 8.

In the latter case, the middle part 30 of the spring includes, at rest, and depending on the diameter of the wire forming the spring, contiguous turns in number such that the stack of these turns has an axial thickness substantially equal to the thickness of the carrier plate 10 decreased by the depth of the groove 50.

The width of the groove 50, without being critical, will be chosen such that it allows the spring B to fulfil all its functions during a braking action, that is to say that it allows a certain angular excursion and a certain deformation of the end part 32 received in the groove 50 when the friction pad A equipped with the spring B and the wear indicator C is in place in the disc brake, as has been represented in FIG. 6.

What is more, as can be seen in FIG. 6, the end parts 32 of the spring B extend the helical part 30 on the same side as the helical part furthest from the friction lining 12, that is to say closest to the torque-withstanding member 16. Thus, when the fully equipped friction pad is installed in the torque-withstanding member 16, a stress is exerted on each of the end parts 32 in the direction of tightening up the turns of the helical part 30 of the spring. As a result, the wear indicator C is fixed into the spring B with even greater reliability, and spontaneous unscrewing of the wear indicator C is even more difficult, if not impossible.

It can therefore be seen that a friction pad for a disc brake has indeed been produced which gives an answer to the problem with which the invention was confronted. Indeed, manufacture of the carrier plate 10 poses no particular difficulties because it requires merely the formation of a through-opening 24, and possibly of a groove 50, the tolerances on which may be quite large. It is therefore not very expensive.

The spring B, itself simple to manufacture, is fixed into the opening 24 simply, and can be extracted therefrom only by a deliberate manoeuvre. Its axial position relative to the carrier plate 10 is perfectly defined by its end parts 32 gripping the carrier plate 10, whether or not a groove 50 has been provided.

The wear indicator C is itself fixed in a simple way, by screwing, into the spring B and automatically adopts its optimum position as regards its warning function when it is screwed home therein. What is more, it is not possible to fit the wear indicator C on the carrier plate 10 without having installed the spring B therein beforehand. Finally, it is markedly more difficult to unscrew the wear indicator C than it is to screw it in, and even practically impossible to unscrew it when the friction pad is in place in the disc brake. The fixing of the wear indicator therefore proves particularly reliable.

Of course, the invention is not limited to the embodiments which have been described, but can in contrast receive numerous modifications which will be obvious to the person skilled in the art and which fall within the context of the appended claims. Thus, for example, it could be envisaged for the turns forming the helical part of the spring B not to be contiguous at rest, and for the pitch of the screw thread 44 of the fitting part of the wear indicator C to be less than the pitch of these turns at rest.

We claim:

1. Assembly comprising a friction pad (A), a spring (B) and a wear indicator (C) for a motor vehicle disc brake, the friction pad (A) including a carrier plate (10) received with anchorage and sliding in a torque-withstanding member (16) of the disc brake, a friction lining (12) being fixed to a part of the surface of a first face of the carrier plate (10) to enter into frictional contact with a rotating disc (22) when a force is applied to a second face of the carrier plate (10) opposite the first face, a through-opening (24) being formed in the carrier plate (10) for fixing a helical part (30) of the spring (B), said helical part (30) being formed of at least one turn of metal wire and of a fitting part (46) of the wear indicator (C) of the friction lining (12) passing through the helical part (30) of the spring (B), characterized in that the spring (B) includes end parts (32, 34) situated on either side of the carrier plate (10), the helical part (30) of the spring (B) being received in the opening (24) of the carrier plate (10), and the fitting part (46) of the wear indicator (C) being formed with a screw thread interacting with the helical part (30) of the spring (B).

2. Assembly according to claim 1, characterized in that the diameter (D) of the fitting part (46) of the wear indicator (C) is at least equal to the diameter (d) of the helical part (30) of the spring (B).

3. Assembly according to claim 2, characterized in that the pitch of the screw thread (44) of the fitting part (46) of the wear indicator (C) is different from the pitch of the turns of the helical part (30) of the spring (B).

4. Assembly according to claim 3, characterized in that the pitch of the screw thread of the fitting part (46) of the wear indicator (C) is less than the pitch of the turns of the helical part (30) of the spring (B).

5. Assembly according to claim 3, characterized in that the turns of the helical part (30) of the spring (B) are contiguous at rest, and in that the pitch of the screw thread (44) of the fitting part (46) of the wear indicator (C) is greater than the pitch of the turns of the helical part (30) of the spring (B).

6. Assembly according to claim 4, characterized in that the helical part (30) of the spring (B) is extended by two straight end parts (32) extending parallel to the first and second faces of the carrier plate (10) and in their immediate vicinity.

7. Assembly according to claim 6, characterized in that the first face of the carrier plate (10) includes at least one limit stop for limiting the angular excursion of the end part (32) of the spring (B), which part is situated in the vicinity of this first face.

8. Assembly according to claim 7, characterized in that the first face of the carrier plate (10) includes a groove (50) with rectangular cross section and with a depth similar to the diameter of the metal wire forming the spring (B), and the flanks of which form two limit stops for limiting the angular excursion of the end part (32) of the spring (B), which part is situated in the vicinity of this first face.

9. Assembly according to claim 1, characterized in that the end parts (32) of the spring (B) extend the helical part (30) of the spring (B) on the same side as the helical part furthest away from the friction lining (12).

10. Assembly according to claim 1 characterized in that said wear indicator includes an electric conductor (40) embedded in a body (42) including a fitting part (46) for fixing said conductor (40) to a carrier plate (10) of a friction pad (A), and said fitting part (46) is formed with a screw thread (44).

* * * * *